United States Patent
Boice et al.

[19]

[11] Patent Number: 6,040,875

[45] Date of Patent: Mar. 21, 2000

[54] METHOD TO COMPENSATE FOR A FADE IN A DIGITAL VIDEO INPUT SEQUENCE

[75] Inventors: Charles E. Boice; John M. Kaczmarczyk, both of Endicott; Agnes Y. Ngai, Endwell; Michael P. Vachon, Johnson City, all of N.Y.

[73] Assignee: International Business Machines Corporation, Armonk, N.Y.

[21] Appl. No.: 09/046,290

[22] Filed: Mar. 23, 1998

[51] Int. Cl.[7] .............................. H04N 9/74; H04N 7/12; H04N 5/14

[52] U.S. Cl. .......................... 348/595; 348/700; 348/701; 348/393; 348/396

[58] Field of Search ..................................... 348/722, 700, 348/701, 845, 391, 393, 394, 395, 396, 595, 358, 364, 370, 375, 382, 386, 699

[56] References Cited

U.S. PATENT DOCUMENTS

| | | | |
|---|---|---|---|
| 5,245,436 | 9/1993 | Alatar ........................................ | 358/182 |
| 5,500,689 | 3/1996 | Lam ......................................... | 348/700 |
| 5,748,903 | 5/1998 | Agarwal .............................. | 395/200.77 |
| 5,771,316 | 6/1998 | Uz ............................................ | 348/394 |
| 5,854,658 | 12/1998 | Uz ............................................ | 348/390 |

*Primary Examiner*—John K. Peng
*Assistant Examiner*—Wesner SaJous
*Attorney, Agent, or Firm*—Scully, Scott, Murphy & Presser; John R. Pivnichny

[57] ABSTRACT

A method to compensate for a fade in a digital video input sequence is provided where the video input sequence is to be compressed according to the MPEG-2 video compression standard. The method comprises a first step of dividing each frame of a current frame into two fields. In a second step, each field of the current frame is divided into at least one field band. In a third step, the luminance and chrominance pixel values are individually summed for the pixels in each field of the current frame. In a fourth step, the luminance pixel values are summed for the pixels in each field band of the current frame. In a fifth step, each respective field band sum and field sum of the current frame is compared with that of the previous frame in the video input sequence. In a sixth step, detection of whether or not a fade has occurred is provided, based upon the comparison in the fifth step. In a seventh step, the encoding algorithm is adjusted if a fade has occurred. Lastly, the first through seventh steps are repeated for at least one subsequent frame in the input video sequence.

37 Claims, 3 Drawing Sheets

METHOD TO COMPENSATE FOR A FADE IN A DIGITAL VIDEO INPUT SEQUENCE

BACKGROUND OF THE INVENTION

1. Field of the Invention

The field of art to which this invention relates is a method to compensate for a fade in a digital video input sequence using a video compression sub-system. Specifically, this invention relates to detecting a fade in the digital video sequence and adjusting the encoding algorithm used by the video compression sub-system when the fade is detected.

2. Description of the Related Art

Within the past decade, the advent of world-wide electronic communications systems has enhanced the way in which people can send and receive information. In particular, the capabilities of real-time video and audio systems have greatly improved in recent years. In order to provide services such as video-on-demand, video conferencing, and multimedia communications to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and/or audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform (DCT), quantization, and variable length coding, all of which are well known in the art. Video compression between pictures is accomplished via a process referred to as motion estimation and compensation, in which a motion vector is used to describe the translation of a set of picture elements (pels) from one picture to another picture. Motion compensation takes advantage of the fact that video sequences are most often highly correlated in time, each frame in any given sequence may be similar to the preceding and following frames. These motion estimation and compensation techniques are also well known in the art.

To carry out the video compression, an encoder scans subsections within each frame, called macroblocks, and identifies which ones have not changed position from one frame to the next. The encoder also identifies reference macro blocks while noting their position and direction of motion, and assigns a motion vector which identifies the motion of the reference block from one frame to another. Only the motion vector and difference data between each reference macro block and the affected current macro block is transmitted to the decoder. The decoder stores the information that does not change from frame to frame in its buffer memory and uses it to periodically fill in the macro blocks of the frame that do not change. The video sequence is subsequently decompressed and displayed close enough to the original video sequence to be acceptable for most viewing.

The MPEG-1 standard was introduced to handle the compressed digital representation of non-video sources of multimedia, and subsequently adapted for the transmission of video signals as long as the video material was first converted from interlaced to progressively scanned format. The MPEG-2 standard was developed to produce higher quality images at higher bit rates for moving images of various applications such as digital storage and communication, and supports both video material in interlaced or progressively scanned formats.

When compressing (or encoding) a video sequence according to a video compression standard, such as the MPEG2 standard for video compression, the possibility exists that a fade may occur in the input video sequence (e.g., video-to-black or black-to-video). Failure of the encoding subsystem to detect and react appropriately to such a fade can result in degraded quality in the compressed video stream. This is due to the encoder choosing poor reference macroblocks or improperly choosing non-intra encoding when an intra decision should have been made. When decompressed and subsequently displayed, video encoded without detection of the fade and appropriate adjustment in the encoding algorithm can have noticeable artifacts in the transmitted video sequence. This results in overall poor picture quality during and immediately following the original fade portion of the video sequence. A need therefore exists for a mechanism to not only detect such fade sequences, but to adjust the manner of encoding to maximize the quality of the encoded result.

SUMMARY OF THE INVENTION

Therefore, it is an object of the present invention to provide a method for detecting a fade sequence in a digital video input sequence.

It is yet another object of the present invention to provide a method for adjusting the encoding algorithm of a video compression sub-system when a fade sequence has been detected to compensate for the fade.

It is still yet another object of the present invention to provide a method compatible with the MPEG-2 video compression standard for adjusting the encoding algorithm of the MPEG-2 video compression sub-system when a fade sequence has been detected in a digital video input sequence.

Accordingly, A method to compensate for a fade in a digital video input sequence is provided where the video input sequence is to be compressed according to a video compression standard. The video compression standard typically has a first encoding processor which applies an encoding algorithm for the compression. The video input sequence comprises a group of sequential picture frames with each frame comprising an array of pixels. Each pixel having associated luminance and chrominance values. The method comprises a first step of dividing each frame of a current frame into two fields. In a second step, each field of the current frame is divided into at least one field band. In a third step, the luminance and chrominance pixel values are individually summed for the pixels in each field of the current frame. In a fourth step, the luminance pixel values are summed for the pixels in each field band of the current frame. In a fifth step, each respective field band sum and field sum of the current frame is compared with that of the previous frame in the video input sequence. In a sixth step, detection of whether or not a fade has occurred is provided, based upon the comparison in the fifth step. In a seventh step, the encoding algorithm is adjusted if a fade has occurred. Lastly, the first through seventh steps are repeated for at least one subsequent frame in the input video sequence.

Also provided is a method for detecting a fade in a digital video input sequence. The method comprises a first step of dividing each frame of a current frame into two fields. In a second step, each field of the current frame is divided into at least one field band. In a third step, the luminance and chrominance pixel values are individually summed for the pixels in each field of the current frame. In a fourth step, the luminance pixel values are summed for the pixels in each field band of the current frame. In a fifth step, each respective field band sum and field sum of the current frame is compared with that of the previous frame in the video input sequence. Lastly, detection of whether or not a fade has occurred is provided, based upon the comparison in the fifth step.

Also provided is a method for adjusting for a fade in a digital video input sequence. The method comprises the step of biasing the encoding of all macroblocks of the current frame towards intra by adjusting the encoding algorithm to force a motion estimation engine of the encoding algorithm to assign a zero motion vector to all macroblocks in the current frame, and adjusting the encoding algorithm to bias its intra/non-intra decision towards intra.

Also disclosed is an external fade detection method by which the user of a video compression standard can signal to the encoder that a fade sequence is occurring in the input video sequence, and force the encoder to adjust the encoding algorithm in the same manner as described above.

In preferred embodiments of the methods of the present invention, the video compression standard is MPEG-2.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Although this invention is applicable to numerous and various types of digital video compression standards, it has been found particularly useful in the environment of the MPEG-2 standard. Therefore, without limiting the applicability of the invention to the MPEG-2 standard, the invention will be described in such environment.

Figure 1A:
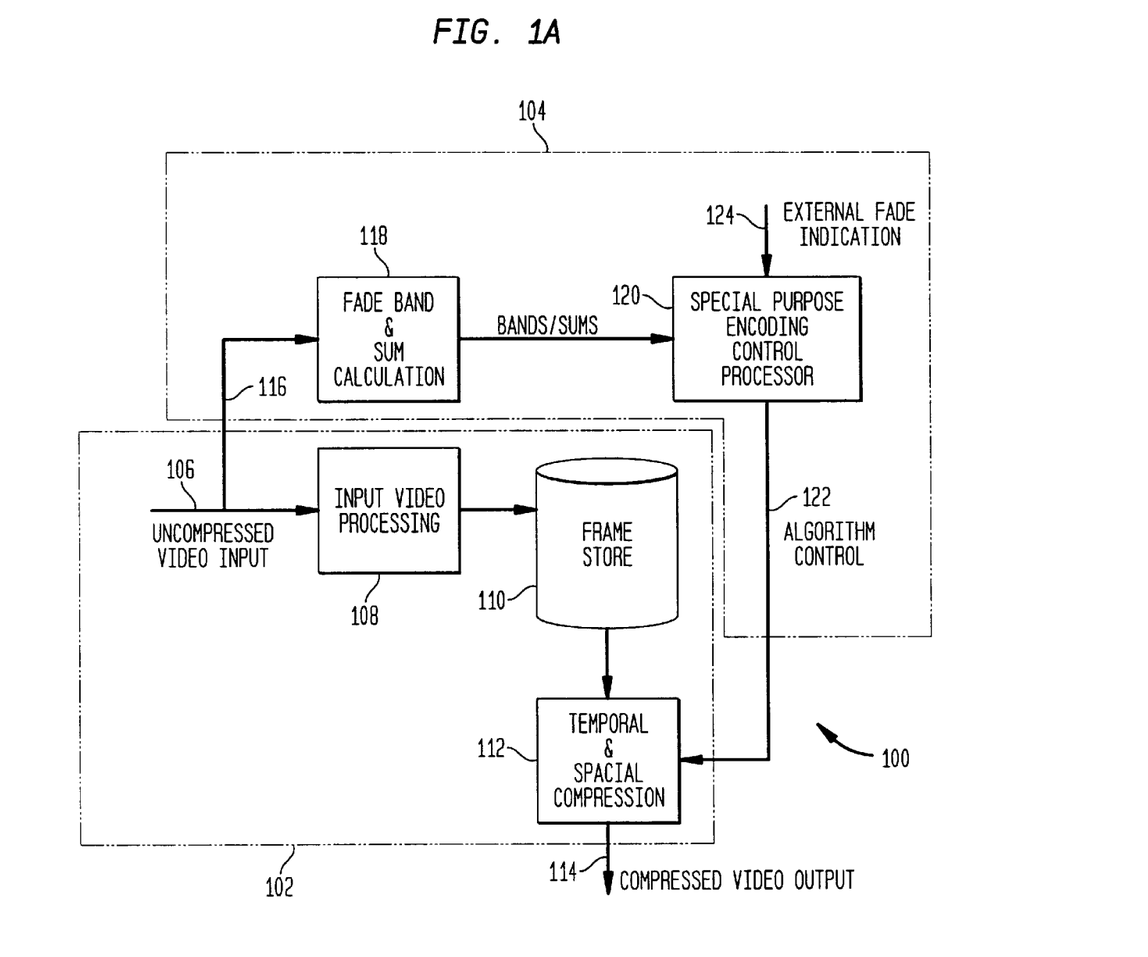
FIG. 1A illustrates a block diagram of the method of the present invention shown in the context of the MPEG-2 video compression standard.

Referring now to FIG. 1A, an overview of the method for fade sequence detection and algorithm adjustment is illustrated along with a typical MPEG-2 encoding system. The method of FIG. 1 being generally referred to by reference numeral 100.

The method of the present invention can be broken into two parallel sub-methods, shown surrounded by dashed lines and referenced as reference numerals 102 and 104. Sub-method 102 is a typical MPEG-2 video compression standard method, while sub-method 104 is the fade detection and algorithm adjustment method of the present invention. The two sub-methods 102, 104 operate in parallel with each other, the MPEG-2 sub-method 102 operating to compress the input video sequence according to a typical encoding algorithm, and sub-method 104 operating to detect a fade sequence in the input video sequence and to adjust the encoding algorithm accordingly.

The MPEG-2 video compression standard is well known in the art, therefore, sub-method 102 will not be discussed in detail. However, an overview will be presented. In a typical MPEG-2 encoding system, a sequence of picture frames of uncompressed digital video is input, shown by arrow 106, into an input video processor 108 which receives the uncompressed video input 106 and loads it into frame format into a frame store 110. The input video is preferably in line format and contains information on each pixel of the pixel array making up each picture frame. Such information typically comprises the associated luminance and chrominance ($C_r$ and $C_b$) values for each pixel of the pixel array. The information from the input video processor 108 is then stored in a frame store 110, i.e., in frame format. The data from the frame store 110 is then input into a MPEG-2 encoder 112 for encoding by the encoding algorithm for temporal and spacial compression. Compressed video is then output from the MPEG-2 encoder 112, shown as arrow 114.

Before discussing each of the steps of the parallel fade detection and algorithm adjustment sub-method 104 in detail, an overview is also provided with reference to FIG. 1A. The uncompressed video input 106 is concurrently sent into the fade detection and algorithm adjustment sub-method 104, shown by arrow 116, and inputs a fade band and sum calculation processor 118, which is preferably hardware driven. At this processor 118, each individual picture frame of the input video is divided into field bands and the luminance and chrominance pixel values for each pixel of each picture frame are summed as discussed below. The bands/sums information is then input to the special purpose encoder 120. The special purpose encoder 120 can be a second encoding processor, or use can be made of the special purpose encoding control processor which is typically part of a standard MPEG-2 encoder. The special purpose encoder 120 makes a comparison between the current picture frame and the previous picture frame and makes the fade determination based upon the bands/sums information calculated for each frame.

If a fade is detected, then the special purpose encoder 120 adjusts the temporal, spatial compression algorithm, shown as arrow 122, to the encoding of the current frame that a fade was detected on. The current frame remains in the frame store 110 until the fade determination is made at the special purpose encoder 120. Therefore, the two sub-methods 102, 104 are timed together, such that the current frame is processed simultaneously in each sub-method 102, 104. The special purpose encoder 120 preferably contains custom microcode for making this determination, and is therefore highly programmable, meaning the algorithm adjustment can be "tuned". If a fade sequence is detected, the current frame undergoes a compression based upon the adjusted encoding algorithm and is output with all other frames at 114.

Figure 1B:
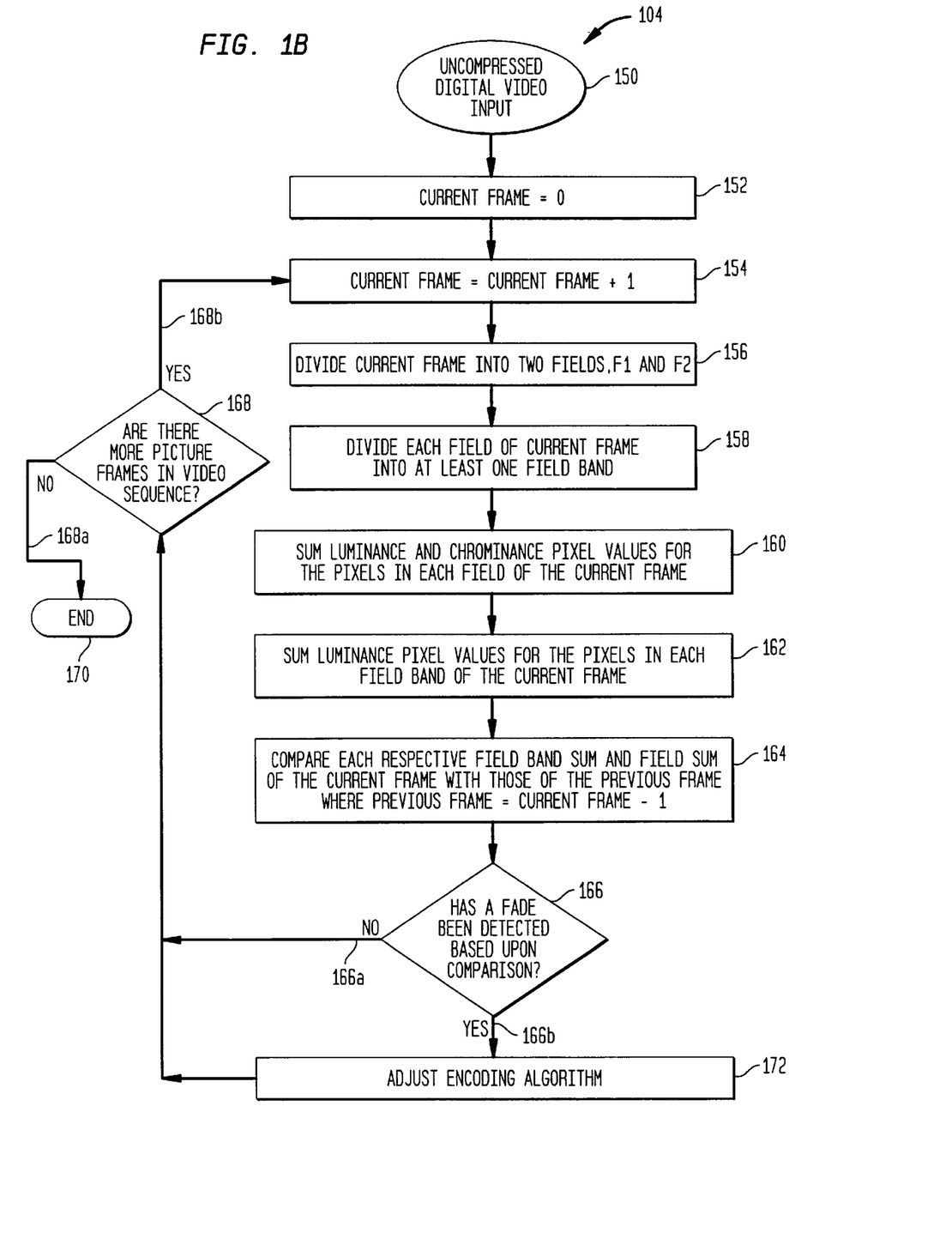
FIG. 1B illustrates a flow diagram of the fade detection and algorithm adjustment method of the present invention.

Referring now to FIG. 1B, sub-method 104 will be described with reference to the flowchart illustrated therein. Uncompressed digital video is input at step 150. Sub-method 104 processes each frame of the input video individually, illustrated in the flowchart at steps 152 and 154. At step 152, the current frame is initialized at a value of 0, while at step 154, the current frame is incremented. While a frame is being processed by sub-method 104, it is referred to as the current frame. At step 156, the current frame is divided into two fields, F1 and F2. Each field of the current frame is then divided into at least one field band at step 158. At step 160, the luminance and chrominance pixel values are summed for the pixels in each field of the current frame. Similarly, at step 162, the luminance pixel values are summed for the pixels in each field band of the current frame.

A comparison is then made at step 164, between the field band sums and the field sums of the current frame with those of the previous frame. Where the previous frame is defined as the frame in the input video data bitstream which immediately precedes the current frame, or "Previous frame= current frame−1". The order in which the video frames are compared at step 164 is preferably input order, however, they can alternatively be compared in encode order.

A test is then performed at step 166, if no fade has been detected in the current frame based upon the comparison in step 164, then the sub-method 104 proceeds along route 166a, to another test 168. At step 168, if there are no more frames in the video input to be processed, then sub-method 104 proceeds along route 168a, to step 170 where the sub-method 104 ends. However, if there are more frames to be processed, the sub-method 104 proceeds along route 168b, where the sub-method 104 repeats from step 154, at which point the current frame is incremented (the current frame becomes the previous frame and the next frame becomes the current frame).

If a fade is detected at step 166 based upon the comparison at step 164, then the sub-method 104 proceeds along route 166b, and the encoding algorithm of the video compression sub-method 102 is adjusted at step 172. The sub-method 104 then proceeds to step 168 where the sub-method 104 either terminates at step 170 or repeats at step 154 as previously described.

The fade band and sum calculations, the fade determination, and the encoding algorithm adjustment steps of sub-method 104 will now be described in detail with regard to a preferred embodiment of the present invention.

Field Band and Sum Calculations

Figure 2:
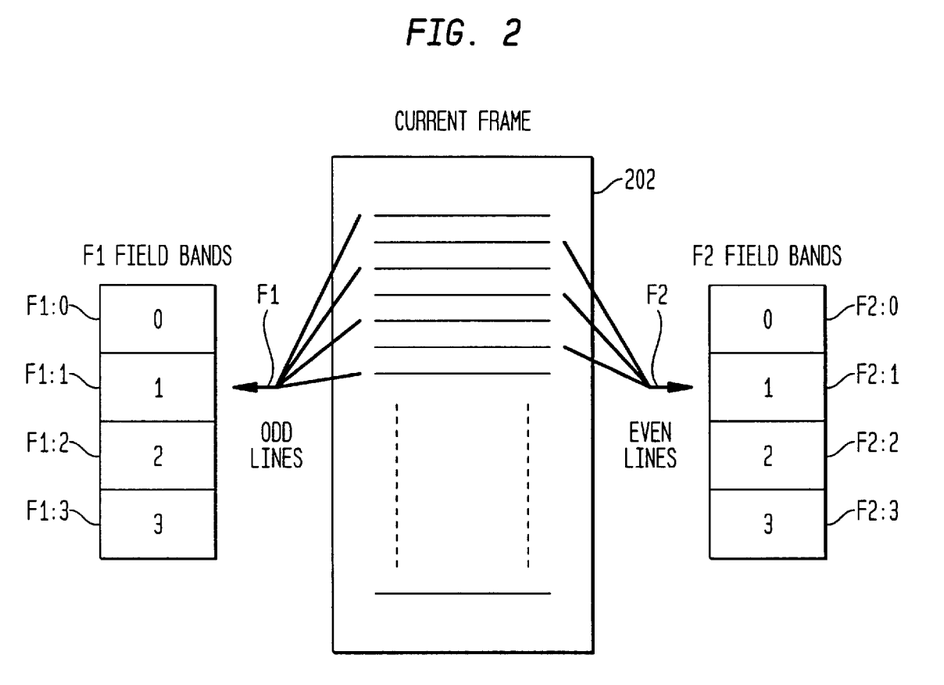
FIG. 2 illustrates the input frame sequence of an input digital video sequence and how it is broken into two fields, each field comprising four field bands.

Referring now to FIG. 2, regardless of whether the input video format presented to the MPEG-2 encoding system 102 is interlaced or progressive, each current video frame 202 is separated into two fields F1 and F2, respectively, at the field band and sum calculation processor 118. The two fields F1, F2 preferably comprise an even and an odd field (i.e., the even and odd pixel lines, respectively, comprising the pixels lines from the current frame). Each field is then divided into at least one field band, preferably four, denoted as field bands 0,1,2, and 3 in FIG. 2. Therefore, field F1 bands are denoted as F1:0, F1:1, F1:2, and F1:3, and field F2 bands denoted by F2:0, F2:1, F2:2, and F2:3. The field band and sum calculation processor 118 determines how many pixel lines will be in each field band. The field bands 0,1,2,3 preferably contain an equal number of pixel regions, wherein the regions are preferably pixel lines, but also could be pixel columns. However, if the number of pixel lines in the current frame is not divisible by the number of field bands chosen, it is preferable for all but the last field band to have an equal number of lines, and the last field band to have the remaining lines. If four field bands are desired, the calculation for "lines per field band" is as follows:

$$L_b = ((L_{fr}/2)+3)/4$$

where $L_b$ is the number of lines per field band and $L_{fr}$ is the number of lines per frame. In the case where four field bands is desired, the fourth band 3 will contain the same number of pixel lines as the other three field bands 0, 1, 2 as long as the current frame has a total number of pixel lines which is a multiple of four. If not, the fourth band 3 will contain the remaining lines in the current frame, which can be as many as three fewer lines than the other three bands 0, 1, 2. However, all the field bands can have unequal size field regions, or lines without departing from the scope or spirit of the invention.

The fade band and sum calculation processor 118 also sums the luminance pixel values for all pixels in each field F1, F2, for each pixel in each field band F1(0, 1, 2, 3) and F2(0,1,2,3), and for the chrominance pixel values for each pixel in the fields F1, F2. Therefore, once an entire input picture frame has been loaded into the encoder, referred to as the current frame, in either progressive or interlaced format, in the case where each field F1, F2 contains four field bands 0, 1, 2, and 3, the following fourteen sums will have been calculated:

Field F1 luminance sum
Field F2 luminance sum
Field F1 $C_r$ chrominance sum
Field F2 $C_r$ chrominance sum
Field F1 $C_b$ chrominance sum
Field F2 $C_b$ chrominance sum
Field F1 band 0 luminance sum
Field F1 band 1 luminance sum
Field F1 band 2 luminance sum
Field F1 band 3 luminance sum
Field F2 band 0 luminance sum
Field F2 band 1 luminance sum
Field F2 band 2 luminance sum
Field F2 band 3 luminance sum Once the above calculations have been determined for the current frame 202, they are sent to the special purpose encoder 120 for analysis. The above analysis is offered by way of example only, and not to limit the scope of the present invention. It is understood by someone in the art, that the above analysis can be modified for other video compression standards or modified for the MPEG-2 standard by using any combination or permutation of the above analysis. For example, the above sums can be calculated only for the entire picture, for only one field, or for any number of field bands per field. Furthermore, only the luminance values may be summed for each picture frame, field, and/or field band, and that information sent to the special purpose encoder 120 for analysis.

Fade Determination

The algorithm disclosed for fade determination can use the field band sums and the field luminance sums for both fields F1, F2 or for either field to make the fade determination. Preferably, the sums from only one of the fields is used for the fade determination.

By way of example only, and not to limit the scope of the invention, the fade determination will be described with reference to only field F1. In the determination of whether or not a fade sequence has been initiated in a current frame, a comparison is made between the F1 field luminance sum and the F1 fade band sums for the current frame and the same sums for the previous frame in the video sequence. A frame will be deemed part of a fade if the following two conditions are satisfied:

1. The rates of change of each of the four F1 field band sums of the current frame with respect to the previous frame are within a small experimentally determined constant of the rate of change of the current F1 field pixel sum with respect to the previous frame's F1 field pixel sum; and 2. The direction of the fade (luminance increase in the case of a black-to-video-fade or luminance decrease in the case of a video-to-black fade) of the F1 field sums is in the same direction as all four F1 field band sums.

An alternative embodiment of the present invention is shown in FIG. 1A, and indicated by arrow 124. In this embodiment, the above described fade detection is not necessary. Instead, the special purpose encoder 120 is configured for external fade detection. In this case, a fade is indicated to the encoding sub-method 104 when a user writes to an external fade register in the special purpose encoder 120 during the input time of the video frame to be considered as a fade.

Regardless of the method of fade detection, whether internally detected by the special purpose encoder 120 based on pixel sum and field band sums, or signaled by the user coincident with the input of the fade frame, the subsequent encoding algorithm adjustment can proceed in the same manner as described herein.

Encoding Algorithm Adjustment

A fade sequence is a group of pictures in which there is a gradual change in intensity from one picture frame to another. The intensity change could be an increase or a decrease. A fade sequence is often used to provide a slower transition between two diversely different scenes. The intensity of the frames is represented by the luminance component. Since luminance data is changed to produce a fade picture, and it is also used in motion estimation, motion estimation during a fade sequence can produce misleading results. The most temporal redundancy occurs between two consecutive pictures when they belong to the same scene, in which case the best match difference is located at the zero-motion-vector macroblock. On the other hand, there is no temporal redundancy between two consecutive pictures in a fade sequence if they belong to different scenes. In this case, if the macroblock in the latter picture is encoded as an intra macroblock coding efficiency of the video sequence containing a fade sequence would be greatly improved. The normal video encoding algorithm must be modified to handle these situations in a fade sequence to improve the coding efficiency.

Once a fade is detected by the special purpose encoder 120, the encoding algorithm is adjusted to ensure that high quality is maintained in the encoded Bitstream. Preferably, two algorithm adjustments are made, both are based on the premise discussed above that during a fade sequence, the reference macroblock of the previous frame may not be a very good reference for the macroblock of the current frame where a fade is detected in the current frame. During a fade, the preference is to force the current macroblock to be an intra macroblock, ensuring that it will become a good reference for subsequent frames. The first algorithm adjustment made is to force the motion estimation engine of the video compression encoder to use a zero motion vector for all macroblocks in a fade frame. This will ensure that the motion estimation engine does not select some non-zero vector pointing to a local minimum best match macroblock that is not really as good a match as the zero motion vector reference macroblock. The second algorithm update is to bias the intra/non-intra decision made by the special purpose encoding control processor towards intra. Again, this is based on the premise that the reference picture will most likely not be a very good reference (or match) for the current macroblock during a fade sequence. This biasing is performed by effectively enlarging the best match difference obtained by comparing the current macroblock with the best reference macroblock, before making the determination that the best match difference is small enough to prefer non-intra encoding versus intra encoding. To further illustrate this biasing, following is a typical code fragment responsible for the intra/non-intra decision when there is no fade detected:

If ((best match_difference>experimentally_ determined_threshhold) and (best_match_ difference>activity_measurement))

macroblock=intra

Else macroblock=non-intra where best_match_difference=the error associated with this macroblock's search results.

and activity_measurement=an indication of the activity or complexity of the current macroblock.

When a fade is detected, the decision is biased by a biasing factor as follows:

If (((biasing_factor*best_match_difference) >experimentally_determined_threshold) and ((biasing_ factor*best_match_difference )>activity_measurement)

macroblock=intra

Else macroblock=non-intra

These two algorithm adjustments help the encoding system 102 react appropriately to the input video fade sequence, and ensure consistent quality in the output compressed video stream. It should be apparent to someone skilled in the art, that both adjustments to the encoding algorithm do not have to be made, alternatively, either of the two adjustments can be made to the encoding algorithm to compensate for the fade sequence.

It is understood by someone skilled in the art that other algorithm adjustments could be made in a similar manner without departing from the scope or spirit of the present invention. Furthermore, although the encoding algorithm adjustment method has been described with reference to MPEG2 video compression, it could be applied to other video compression techniques such as MPEG-1.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A method to compensate for a fade in a digital video input sequence which is compressed according to a video compression standard in which a first encoding processor applies an encoding algorithm for the compression, the video input sequence comprising a group of sequential picture frames, each frame comprising an array of pixels, each pixel having associated luminance and chrominance values, the method comprising the steps of:

(a) dividing each frame of a current frame into two fields,     (b) dividing each field of the current frame into at least one field band,     (c) summing the luminance and summing the chrominance pixel values for the pixels in each field of the current frame,     (d) summing the luminance pixel values for the pixels in each field band of the current frame,     (e) comparing each respective field band sum and field sum of the current frame with that of the previous frame in the video input sequence, (f) detecting whether a fade has occurred based upon the comparison in step (e), (g) adjusting the encoding algorithm if a fade has occurred, and (h) repeating steps (a) through (g) for at least one subsequent frame in the input video sequence.

2. The method of claim 1, wherein the video compression standard is MPEG-2.

3. The method of claim 1, wherein the luminance and chrominance values comprise one luminance value and two chrominance values.

4. The method of claim 1, wherein the two fields are even and odd fields comprised of even and odd pixel lines respectively.

5. The method of claim 1, wherein the field bands comprise an equal number of pixel regions.

6. The method of claim 1, wherein the field bands comprise an unequal number of pixel regions.

7. The method of claim 5, wherein each field is divided into four field bands.

8. The method of claim 1, wherein all but the last field band comprises an equal number of video lines and the last field band comprises the remaining number of lines of its respective field.

9. The method of claim 8, wherein the number of field bands is four and where the number of lines per field band is determined by the following equation:

$$L_b = ((L_{fr}/2)+3)/4$$

where $L_b$ is the number of lines per field band and $L_{fr}$ is the number of lines per frame.

10. The method of claim 1, further comprising the step of sending the summed values from steps (c) and (d) to a second encoding processor for comparison in step (e).

11. The method of claim 10, wherein the second encoding processor is a special purpose encoding control processor within the first encoding processor.

12. The method of claim 1, wherein step (f) further comprises the sub-steps of:

(i) determining a rate of change for each of the field band sums of at least one of the fields for the current frame, and (ii) determining if there is a luminance sum increase or decrease in the field sums and field band sums of at least one of the fields of the current frame, wherein a fade is detected if either or both of the following conditions are met:

the rates of change of each of the field sums of the current frame are within a predetermined constant with respect to the previous frame; and the luminance field sums and all luminance band sums of at least one field all either increase or decrease with respect to the previous frame.

13. The method of claim 12, wherein only one field is used to make the determinations in sub-steps (i) and (ii).

14. The method of claim 12, wherein both of the conditions must be met to detect a fade.

15. The method of claim 1, wherein step (g) comprises biasing the encoding of all macroblocks of the current frame towards intra if a fade is detected at step (f).

16. The method of claim 15, wherein biasing the encoding of all macroblocks of the current frame towards intra comprises the sub-steps of:

(i) adjusting the encoding algorithm to force a motion estimation engine of the encoding algorithm to assign a zero motion vector to all macroblocks in the current frame, and (ii) adjusting the encoding algorithm to bias its intra/non-intra decision towards intra.

17. The method of claim 1, wherein steps (a) through (f) are replaced by the step of externally indicating, by means of a user input to a second encoding processor, that a fade has occurred between the current frame and the previous frame.

18. The method of claim 1, wherein the comparing step is carried out in input order.

19. The method of claim 1, wherein the comparing step is carried out in encode order.

20. A method for detecting a fade in a digital video input sequence which is compressed according to a video compression standard in which a first encoding processor applies an encoding algorithm for the compression, the video input sequence comprising a group of sequential picture frames, each frame comprising an array of pixels, each pixel having associated luminance and chrominance values, the method comprising the steps of:

(a) dividing each frame of a current frame into two fields, (b) dividing each field of the current frame into at least one field band, (c) summing the luminance and summing the chrominance pixel values for the pixels in each field of the current frame, (d) summing the luminance pixel values for the pixels in each field band of the current frame, (e) comparing each respective field band sum and field sum of the current frame with that of the previous frame in the video input sequence, and (f) detecting whether a fade has occurred based upon the comparison in step (e).

21. The method of claim 20, wherein the video compression standard is MPEG-2.

22. The method of claim 20, wherein the luminance and chrominance values comprise one luminance value and two chrominance values.

23. The method of claim 20, wherein the two fields are even and odd fields comprised of even and odd pixel lines respectively.

24. The method of claim 20, wherein the field bands comprise an equal number of pixel regions.

25. The method of claim 20, wherein the field bands comprise an unequal number of pixel regions.

26. The method of claim 24, wherein each field is divided into four field bands.

27. The method of claim 20, wherein all but the last field band comprises an equal number of video lines and the last field band comprises the remaining number of lines of its respective field.

28. The method of claim 27, wherein the number of field bands is four and where the number of lines per field band is determined by the following equation:

$$L_b = ((L_{fr}/2)+3)/4$$

where $L_b$ is the number of lines per field band and $L_{fr}$ is the number of lines per frame.

29. The method of claim 20, further comprising the step of sending the summed values from steps (c) and (d) to a second encoding processor for comparison in step (e).

30. The method of claim 29, wherein the second encoding processor is a special purpose encoding control processor within the first encoding processor.

31. The method of claim 20, wherein step (f) further comprises the sub-steps of:

(i) determining a rate of change for each of the field band sums of at least one of the fields for the current frame, and (ii) determining if there is a luminance sum increase or decrease in the field sums and field band sums of at least one of the fields of the current frame, wherein a fade is detected if either or both of the following conditions are met:

the rates of change of each of the field sums of the current frame are within a predetermined constant with respect to the previous frame, and the luminance field sums and all luminance band sums of at least one field all either increase or decrease with respect to the previous frame.

32. The method of claim 31, wherein only one field is used to make the determinations in sub-steps (i) and (ii).

33. The method of claim 31, wherein both of the conditions must be met to detect a fade.

34. The method of claim 20, wherein the comparing step is carried out in input order.

35. The method of claim 20, wherein the comparing step is carried out in encode order.

36. A method for adjusting for a fade in a digital video input sequence which is compressed according to a video compression standard in which a first encoding processor applies an encoding algorithm for the compression, the video input sequence comprising a group of sequential picture frames in which a fade is detected at a current frame, the method comprising the steps of:

biasing the encoding of all macroblocks of the current frame towards intra, said biasing step including:

comparing the current macroblock with a best reference macroblock and obtaining a best match difference thereof, enlarging said difference obtained with a predetermined biasing factor; and comparing said enlarged difference with a predetermined threshold, said macroblock being encoded as intra when said difference exceeds said threshold.

37. The method of claim 36, where in said predetermined threshold includes a value associated with activity level of current macroblock, said macroblock being encoded as intra when said difference exceeds said value.

* * * * *

UNITED STATES PATENT AND TRADEMARK OFFICE
CERTIFICATE OF CORRECTION

PATENT NO. : 6,040,875
DATED : March 21, 2000
INVENTOR(S) : Charles E. Boice, et al.

It is certified that error appears in the above-identified patent and that said Letters Patent is hereby corrected as shown below:

Column 5, Line 38: "Calculations" should read --Calculations:--

Column 6, Line 45: "Determination" should read --Determination:--

Column 7, Line 18: "Adjustment" should read --Adjustment:--

Column 8, Line 46: After "appended claims." Insert

--Claims--

Column 12, Line 18: "where in" should read --wherein--

Signed and Sealed this

Thirteenth Day of February, 2001

Attest:

NICHOLAS P. GODICI

Attesting Officer

Acting Director of the United States Patent and Trademark Office